(12) United States Patent
Gaston et al.

(10) Patent No.: US 6,907,348 B2
(45) Date of Patent: Jun. 14, 2005

(54) SYNTHETIC ACOUSTIC ARRAY ACQUISITION AND PROCESSING

(75) Inventors: Graham A. Gaston, Hannover (DE); Richard J. Kostelnick, Dickinson, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 10/364,938

(22) Filed: Feb. 12, 2003

(65) Prior Publication Data

US 2004/0158404 A1 Aug. 12, 2004

(51) Int. Cl.$^7$ .................................................. G01V 1/28
(52) U.S. Cl. ............................................ 702/10; 702/14
(58) Field of Search ............................. 702/6, 7, 9, 10, 702/14, 17; 367/57; 73/152.03, 152.46

(56) References Cited

U.S. PATENT DOCUMENTS

| | | | |
|---|---|---|---|
| 4,672,588 A | 6/1987 | Willen | 367/28 |
| 4,982,381 A | 1/1991 | Mari | 367/27 |
| 5,089,989 A | 2/1992 | Schmidt et al. | 367/35 |
| 5,616,840 A * | 4/1997 | Tang | 73/152.05 |
| 5,784,333 A * | 7/1998 | Tang et al. | 367/30 |
| 6,084,826 A | 7/2000 | Leggett, III | 367/82 |
| 6,088,294 A | 7/2000 | Leggett, III et al. | 367/25 |
| 6,131,694 A | 10/2000 | Robbins et al. | 181/105 |
| 6,166,994 A | 12/2000 | Jeffryes | 367/57 |
| 6,477,112 B1 * | 11/2002 | Tang et al. | 367/38 |
| 2002/0159332 A1 | 10/2002 | Thomann et al. | 367/35 |

* cited by examiner

*Primary Examiner*—Donald McElheny, Jr.
(74) *Attorney, Agent, or Firm*—Madan, Mossman & Sriram, P.C.

(57) ABSTRACT

The present invention provides a method of determining a property of an earth formation using an acoustic logging tool on a bottomhole assembly (BHA) in a borehole in the earth formation. At least one transmitter is used in the acoustic logging tool for generating acoustic signals into the formation at a first depth of the BHA. A plurality of receivers is used on the logging tool for receiving signals indicative of a parameter of interest. The plurality of receivers are spaced apart axially from the at least one transmitter. The measurements are repeated at least one additional depth of the BHA. The signals at the first depth and subsequent additional depths are sorted into at least one of (i) a common receiver gather, (ii) a common offset gather, and, (iii) a common-midpoint gather, giving re-sorted signals. The re-sorted signals are processed to obtain the parameter of interest.

23 Claims, 16 Drawing Sheets

SYNTHETIC ACOUSTIC ARRAY ACQUISITION AND PROCESSING

FIELD OF THE INVENTION

This invention relates to the field of geophysical prospecting and to a method and system for acoustic array processing of downhole seismic data. The method and system is related generally to drilling and measurement systems and more particularly to a system of drilling boreholes having a measurement-while-drilling ("MWD") tool wherein the MWD tool has seismic sources and sensors.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

Those skilled in the art have long recognized the importance of obtaining various borehole measurements during the course of a drilling operation. Typically, these measurements include such data as the weight imposed on the drill bit, the torque applied to the drill string, the inclination and azimuthal direction of the borehole interval that is then being drilled, borehole pressures and temperatures, drilling mud conditions as well as formation parameters including, but not limited to, resistivity and natural gamma emission of the earth formations being penetrated. Heretofore most of these measurements were obtained either by temporarily positioning special measuring devices in the drill string or by periodically removing the drill string and employing suitable wireline logging tools.

In recent years, however, the drilling technology has advanced sufficiently that these measurements can now be readily obtained by so-called measurement-while-drilling or "MWD" tools that are tandemly coupled in the drill string and operated during the drilling operation. Several MWD tools presently in commercial operation typically include a thick-walled tubular body carrying various sensors and their associated measurement-encoding circuitry which is preferably positioned in the drill string just above the drill bit for measuring the conditions near the bottom of the borehole. These commercial tools generally employ a selectively-operable acoustic signaler which is cooperatively arranged in the tool body for successively transmitting encoded measurement signals through the drilling mud within the drill string to the surface where the signals are detected and recorded by suitable surface instrumentation.

The typical commercial MWD tool is arranged as a multi-sectional tool having various special-purpose modules that are respectively housed in separable thick-walled bodies and suitably arranged to be coupled together in various combinations for assembling an MWD tool capable of obtaining one or more selected measurements. The multiple sections require both mechanical and electrical connections, such as the prior art arrangement shown in FIG. 1. The illustrated components, known in the prior art, include transmitters and sensors for determining downhole formation characteristics. The prior art methods and apparatus include downhole tools comprising acoustic signal transmitters and sensors to determine, for example, subsurface formation velocity as the tool traverses the formation. This type of measurement does not provide for determining an image of subsurface formation reflectors before the drill bit has reached the reflectors.

In U.S. Pat. No. 6,088,294, Legget et al, disclose an invention that provides a closed-loop system for drilling boreholes. The system includes a drill string having a drill bit and a downhole subassembly having a plurality of sensors and measurement-while-drilling devices, a downhole computing system and a two-way telemetry system for computing downhole bed boundary information relative to the downhole subassembly. The downhole subassembly includes an acoustic MWD system which contains a first set of acoustic sensors for determining the formation acoustic velocities during drilling of the wellbore and a second set of acoustic sensors that utilizes the acoustic velocities measured by the system for determining bed boundaries around the downhole subassembly. A computing system is provided within the downhole subassembly which processes downhole sensor information and computes the various parameters of interest including the bed boundaries, during drilling of the wellbore. In one embodiment, the first and second sets (arrangements) of acoustic sensors contain a transmitter and a receiver array, wherein the transmitter and some of the receivers in the receiver array are common to both sets of acoustic sensors. Each receiver in the receiver array further may contain one or more individual acoustic sensors. In one configuration, the distance between the transmitter and the farthest receiver in one of the acoustic sensor sets is substantially greater than the distance between the transmitter and center of the receivers in the second set. The downhole computing system contains programmed instructions, models, algorithms and other information, including information from prior drilled boreholes, geological information about the subsurface formations and the borehole drill path. This invention is directed to determining formation boundaries adjacent to the logging tool and not toward looking ahead of the tool in the direction of drilling.

In one embodiment of the Leggett et al invention, the acoustic system includes one acoustic sensor arrangement for determining the acoustic velocity of the formation surrounding the downhole tool, a second acoustic sensor arrangement for determining the first bed boundary information (such as the acoustic travel time an/or the distance), and a third acoustic arrangement for determining the second bed boundary information, independent of the first bed boundary information. Additionally, the acoustic sensor arrangement defined by the drill bit as the transmitter and an appropriate number of receivers may be utilized in determining the acoustic velocities and/or the bed boundary information. The multiple acoustic array arrangements provide for determining bed boundaries adjacent to the tool, as the tool traverses adjacent to the earth formation, but this arrangement is impractical for imaging ahead of the BHA in the direction of drilling.

U.S. Pat. No. 6,084,826 to Legget discloses an invention that provides apparatus and methods for obtaining acoustic measurements or "logs" of earth formations penetrated by a borehole. More particularly, the invention is directed toward obtaining the acoustic measurements while the borehole is being drilled. The downhole apparatus comprises a plurality of segmented transmitters and receivers which allows the transmitted acoustic energy to be directionally focused at an angle ranging from essentially 0 degrees to essentially 180 degrees with respect to the axis of the borehole. Downhole computational means and methods are used to process the full acoustic wave forms recorded by a plurality of receivers. A two way communication system is also used in the preferred embodiment of the invention.

The physical arrangement and firing sequences of the segmented transmitters in the Leggett disclosure are such that acoustic energy can be directed or focused into the formation in a predetermined azimuth and axial direction. This feature of the invention allows acoustic parameters to be measured in selected regions in the vicinity of the downhole assembly. Regions to be investigated can be selected in real time by sending commands from the surface or, alternately, can be preselected. As an example, the segmentation of transmitters allows measurements to be made ahead of the drill bit thereby providing the driller with critical information concerning formations and structures that have not yet been penetrated by the drill bit. The circumferential spacing of transmitters permits the focusing of transmitted acoustic energy azimuthally to determine the distance to adjacent bed boundaries in horizontal or highly deviated wells thereby assisting the driller in maintaining the drill bit within the formation of interest. It would be advantageous to be able to determine beds adjacent or ahead of the drill bit without the necessity to "direct or focus" the energy into the formation by using the multiple transmitters as in the Leggett disclosure.

U.S. Pat. No. 6,166,994 to Jeffryes discloses a method of exploring a subterranean formation ahead of a drill bit penetrating the formation. A bottom hole assembly is lowered into a borehole filled with a fluid. The assembly includes a drill bit, a source of acoustic energy and a plurality of receivers sensitive to acoustic energy. While operating the drill bit, acoustic energy is emitted from the source into the fluid and the formation, thereby generating a primary compressional wave travelling within the fluid and secondary compressional waves travelling within the fluid, which are converted into compressional waves at the bottom end of the borehole from acoustic energy reflected from within the formation. The primary compressional waves are detected. Information derived from detected primary compressional waves is used to detect the secondary compressional waves. The detected secondary compressional waves are then evaluated to obtain features of the formation ahead of the drill bit. According the disclosure, a disadvantage of the method is that events at a wide angle to the bit will be attenuated. It would be advantageous to have a method and apparatus capable of imaging feature ahead of the drill bit at an angle to the direction of drilling.

The methods and apparatus of the present invention overcome the foregoing disadvantages of the prior art by providing an integrated MWD system which provides for improved seismic imaging, even using single transmitters or receivers, in the direction of drilling.

SUMMARY

The present invention provides a method and system of using an acoustic logging tool conveyed in a borehole formation for determining a characteristic of the formation. The logging tool has at least one source and at least one receiver. Seismic data are acquired, a formation velocity is determined and an angle of investigation is selected. Time shifts are selected such that the source and receiver appears to be collocated at a selected reference depth, and the time shifts are applied to the seismic data. The method provides for imaging reflections in subsurface formations before drilling into them. The method can include cascading seismic sources to improve the signal to noise ratio. One or more quadrants around the wellbore may be investigated.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method and system for a downhole seismic source with receivers for use while drilling that is able to image ahead of the drilling assembly which overcomes the above-described deficiencies of current methods. Accordingly, the method and apparatus of the present invention allow for determining seismic images of reflectors ahead of the drillbit in and near the direction of drilling. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

Figure 1:
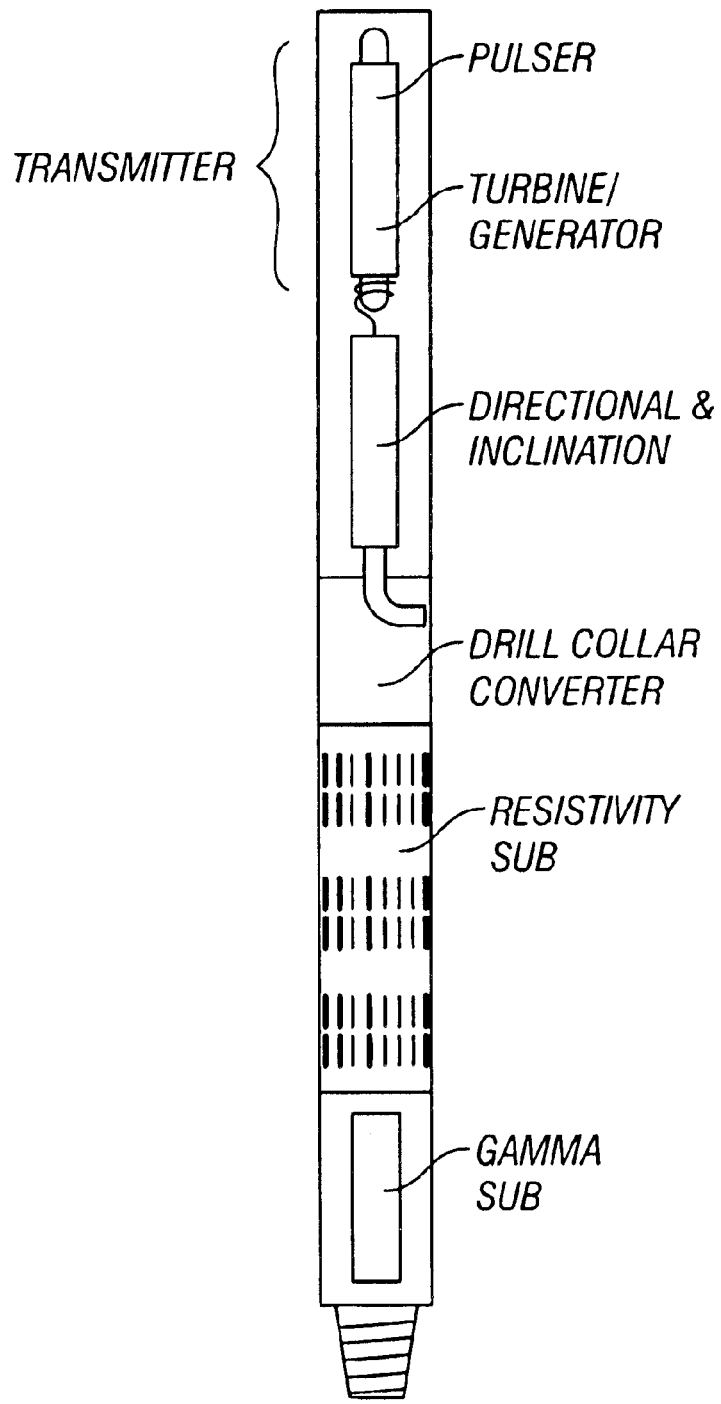
FIG. 1 is a schematic of a prior art MWD downhole tool.
Figure 2:
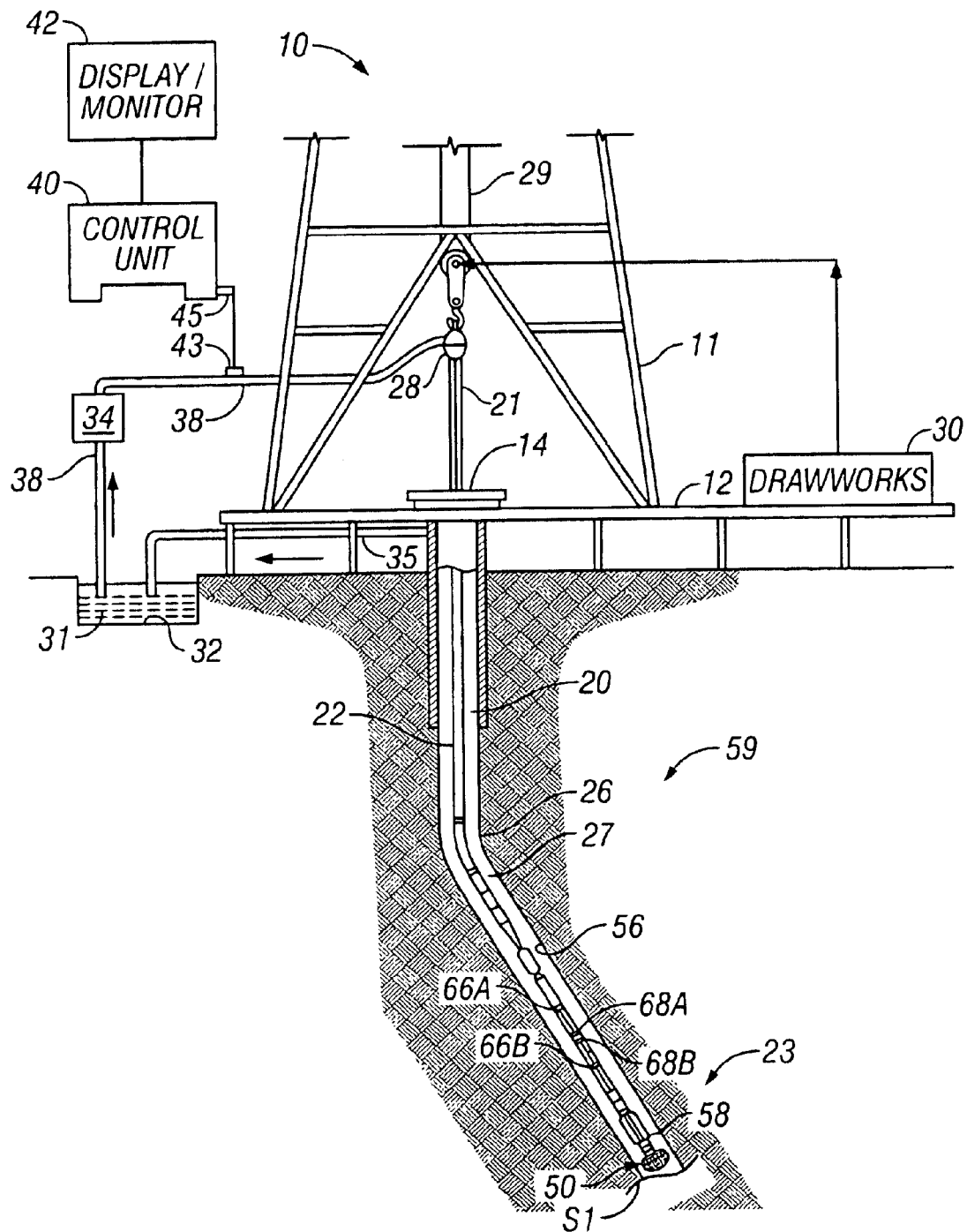
FIG. 2 is a schematic of a drilling system according to one embodiment of the present invention.

FIG. 2 shows a schematic diagram of a drilling system 10 having a downhole assembly containing a downhole sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formation 23 when it is rotated. The drill string 20 is coupled to a drawworks 30 via a kelly joint 21, swivel 28 and line 29 through a system of pulleys (not shown). During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 or other appropriate places and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

In the preferred embodiment of the present invention, the downhole drilling assembly 59 (also referred to as the bottomhole assembly or "BHA") which contains the various sensors and MWD devices to provide information about the formation 23 and downhole drilling parameters, is coupled between the drill bit 50 and the drill pipe 22.

Referring to FIG. 2, the BHA 59 also contains downhole sensors and devices in addition to the above-described surface sensors to measure downhole parameters of interest. Such devices include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The above-noted devices transmit data to the downhole pulser 134, which in turn transmits the data uphole to the surface control unit 40. The present invention preferably utilizes a mud pulse telemetry technique to communicate data from downhole sensors and devices during drilling operations. A transducer 43 placed in the mud supply line 38 detects the mud pulses responsive to the data transmitted by the downhole pulser 134. Transducer 43 generates electrical signals in response to the mud pressure variations and transmits such signals via a conductor 45 to the surface control unit 40. Alternatively, other telemetry techniques such electromagnetic and acoustic techniques or any other suitable technique may be utilized for the purposes of this invention.

The method and apparatus of the present invention provides for producing seismic data sets that are relatively simple and fast to implement using downhole tools comprising seismic transducers. Not only is the invention able to image straight ahead of the drilling assembly, along the borehole axis, but by a simple adjustment we are able to choose an angle of investigation away from the borehole axis. The simple adjustment to change the angle of investigation entails recomputing results from the data without any need to acquire new data. The method of the present invention provides for synthesizing long receiver arrays with processing that requires simple and fast algorithms and is able to image ahead of the drill string at chosen angles. The method is fast enough to allow for processing to determine seismic images of reflectors prior to drilling through the reflectors.

Figure 3A:
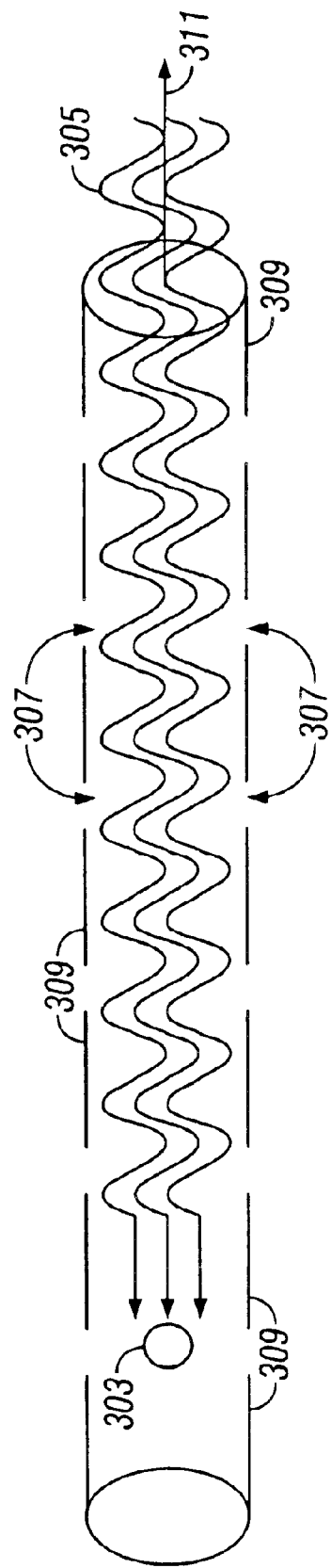
FIG. 3A illustrates a directional acoustic receiver.

The acquisition geometry for seismic imaging ahead of the drill bit has long been a problem when drilling a well. The particular geometry for down hole seismic data acquisition equipment is that of equipment in a long relatively thin borehole with very little orthogonal aperture in the direction of drilling (width with respect to the direction we are wanting to look in). Such a geometry is illustrated in FIG. 3A for a directional receiver that is analogous to the situation of either an antenna or the shotgun microphone. The directional receiver discriminates against signals 305 arriving from all sectors except those traveling substantially along its axis 311. The sound traveling along the axial direction is unrestricted and is received at the microphone 303 at the end of the barrel. As illustrated in FIG. 3A microphone receiver element 303 is in a 'shotgun barrel' or similar structure 309. The shotgun barrel configuration of FIG. 3A is shown with slits 307 in the sides of the barrel 309.

Figure 3B:
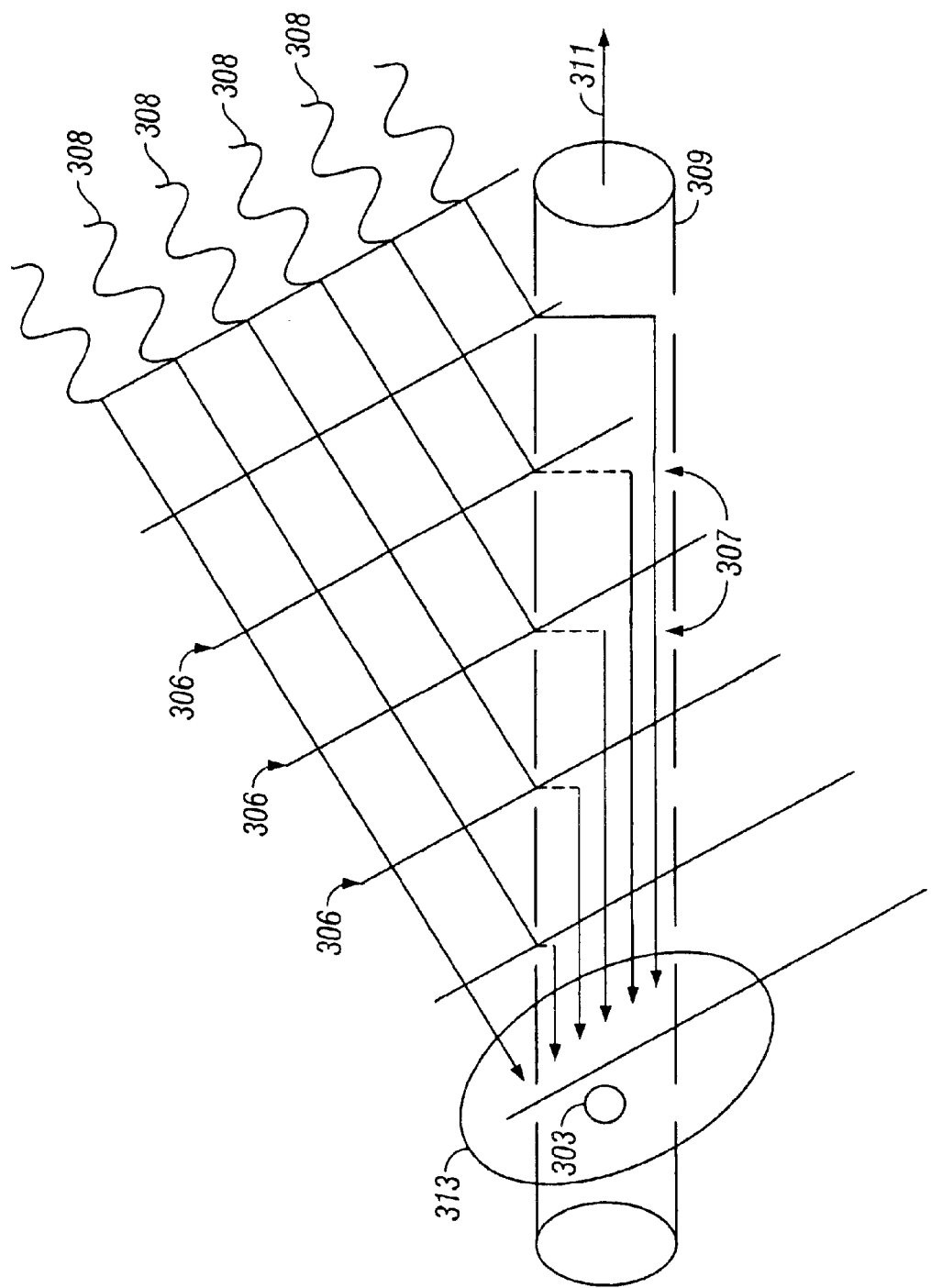
FIG. 3B illustrates off-axis sound waves encountering a directional acoustic receiver.

As illustrated in FIG. 3B, as off-axis sound waves 308 encounter the barrel 309 then the acoustic path lengths for the incident wavefront 308 are broken up by the slit entrances 307. Each wavefront passing through a slit 307 arrives at the microphone out of phase with it's neighbor. Destructive interference 313 is the result as the sound arrives at the sensor 303, so the off-axis sound is diminished in amplitude.

This off-axis insensitivity can be reversed or modified. For example, when we place helium gas within the shot gun barrel, the inner barrel wave speed is increased so that, for a particular off-axis angle, the microphone receives all signals in-phase. As an alternative to reorienting the microphone, the acceptance angle can be steered off-axis by altering the velocity contrast between the shot gun microphone's interior and exterior. Effectively, we steer the angle of sensitivity by adjusting the time of arrival of the sound at the microphone. This creates constructive interference of the sound waves for chosen angles, and destructive interference of sound waves from other angles.

Figure 3C:
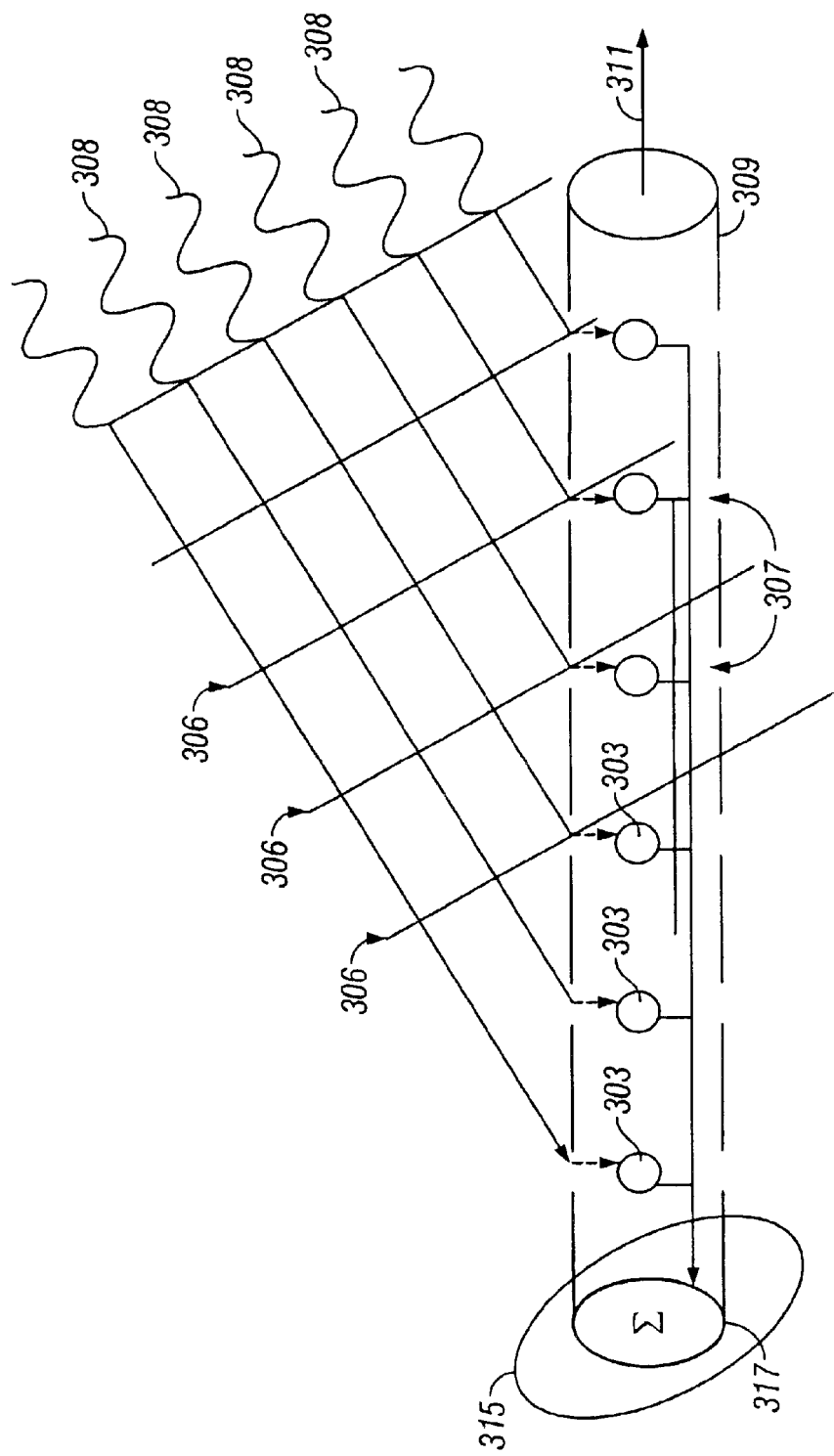
FIG. 3C illustrates a schematic example of an acoustic receiver array in a downhole environment.

FIG. 3C illustrates a schematic receiver setup example for the method and system of the present invention for the situation of processing the received data in a downhole environment. The present situation is analogous to placing multiple microphones 303 along the barrel 309 so that the signals 308 are received in differing physical positions. These electronic signals 308 are then sent through a summing circuit 317 which have selective time delays for each channel and are further dependent on source to receiver geometry, the receiver geometry and velocity. In this way the angle of sensitivity can be easily selected and changed. In the MWD case, off-axis steering and focusing can be selectively enabled for the returning reflected seismic signal. The data (for example, trace recordings) from each receiver are delayed relative to one another by an amount that depends on the local formation velocity and off-axis angle. Finally, all traces are summed together, resulting in a focused "look-ahead" image determined from the reflected seismic waves.

As an example for illustration purposes of the present invention, a downhole tool can use at least one source and a plurality of receivers (for example, one source and 8 receivers) to investigate the velocity of acoustic energy in the formations around the drilling assembly and ahead of the tool in the drilling direction. In conventional prior art acoustic logging, recorded seismic traces having a Common Source are employed in the determination of formation velocity. Only the acoustic energy that is refracted along the borehole formation wall is of interest. The time shift (usually termed move-out or step-out) between adjacent traces is indicative of the formation velocity. As is known by practitioners versed in the art, this only works well when the formation has a higher acoustic wave speed than the borehole fluid. Additionally, high velocity waves traveling along the tool itself may need to be attenuated by mechanical filtering.

Figure 4A:
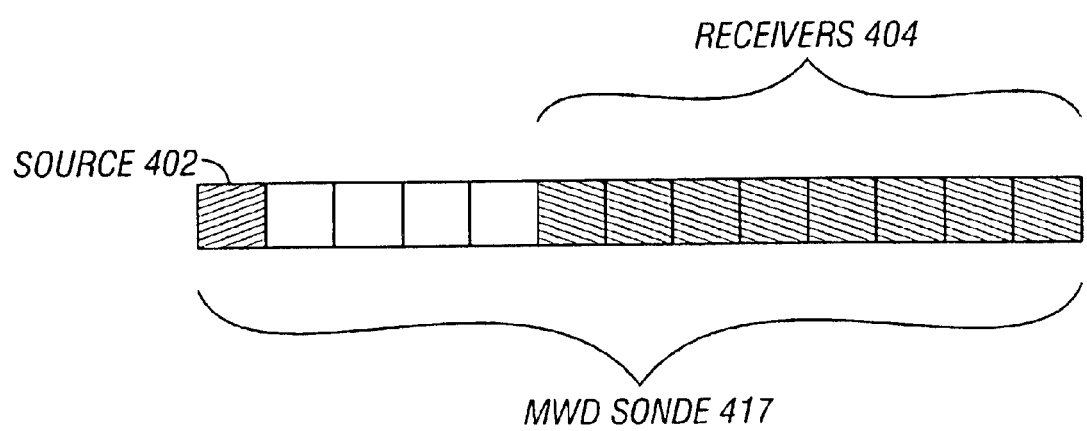
FIG. 4A illustrates a schematic of a downhole seismic acquisition tool.

The illustration of FIG. 4A shows exemplary relative positions of the source and receiver geometry positions on an schematic example of a down hole sonic tool 417. The down hole sonic tool 417 has one source point 402 and eight receivers 404. Those skilled in the art will understand the method and apparatus of the invention is not limited to any specific number of sources and receivers, or any specific geometrical relation of the sources and receivers on the tool. The example down hole sonic tool 417 geometry in FIG. 4A is for ease of illustration.

As fresh formation is drilled into and seismic data acquired, the formation velocity can be calculated from Common Source gathers. Common Source gathers are a common way of acquiring seismic data. The Common Source gather that can be acquired with the down hole tool 417 could be a recording of eight traces each of the eight receivers 404 that have received seismic energy from one source 402. It will be appreciated that a very fine spacing, a coarse spacing, or any arbitrary spacing could be used.

Figure 4B:
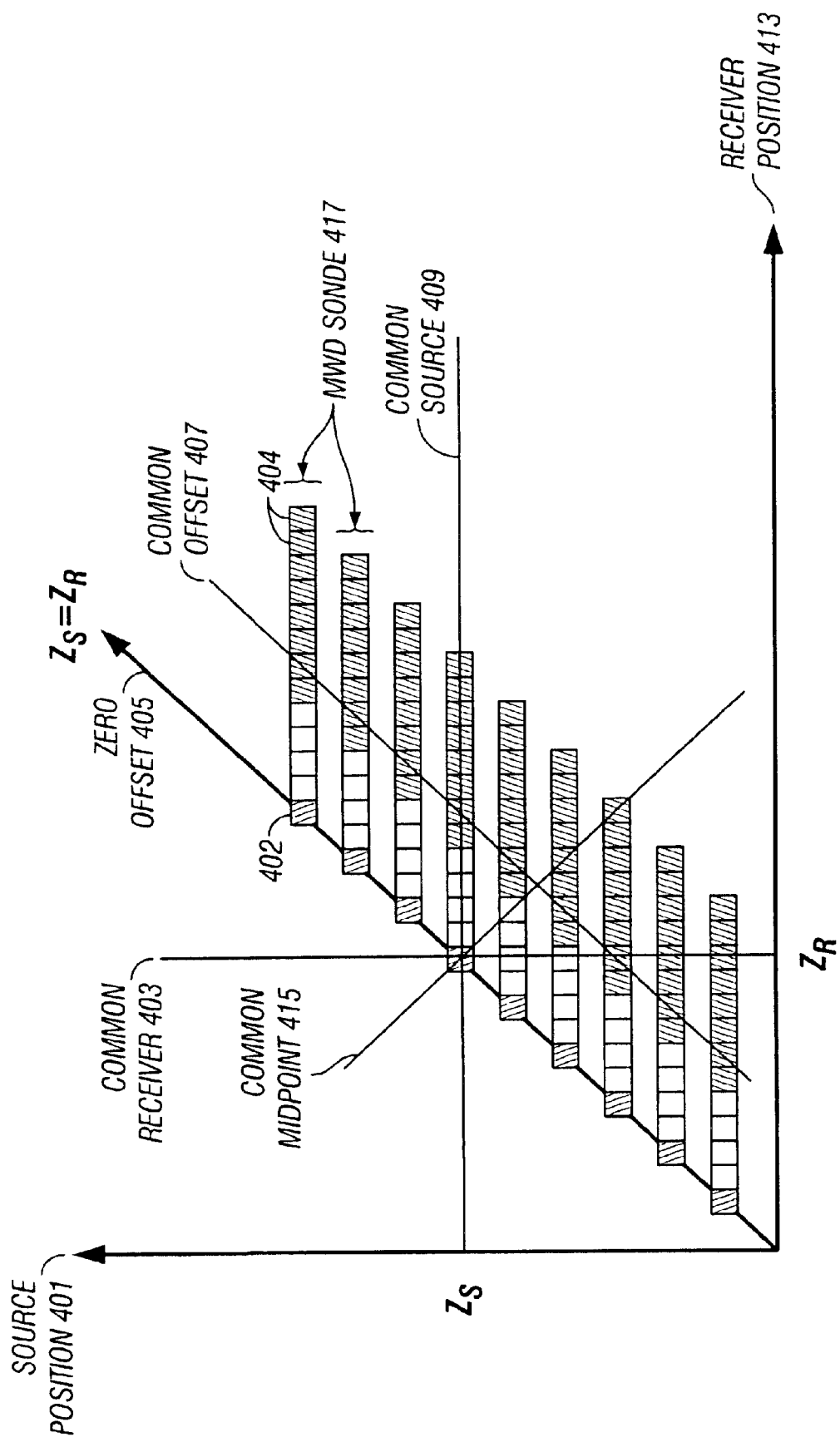
FIG. 4B illustrates the relative positional data of the receivers for various types of data gathers.

FIG. 4B illustrates the relative shot and receiver positions of a down hole tool 417 on a very regular spacing for illustration purposes. By showing the $Z_S$ axis 401 we can see that when source and receiver are at a common depth we plot them along a 45 degree line 405. Other lines illustrate Common Source 409, Common Offset 407 and Common Midpoint 415 sets, as well as the Receiver Position axis 413 for determination of $Z_R$.

The present invention provides imaging for seismic reflections that occur away from and in particular ahead of the drill bit along and near the axis of the borehole. This requires focusing the source energy in the down-hole direction while rejecting all but the received reflected energy moving up-hole. By having a consistent source signature firing into the same type receivers it is possible to view the data as if it came from a single source and received by a single receiver. By mathematically manipulating the data in time by selecting appropriate time delays we can make the data appear like the source and the receiver were at the same depth. The time to shift a trace in time would be a time shift $\Delta t$ that corrects the reflection time for a source located at depth $Z_S$ and receiver located at depth $Z_R$ so that it appears the source and receiver were collocated at a depth $Z_O$. Then, if the waves arrived at an angle $\theta$ to the tool, then we replace the formation velocity v by the phase velocity $$\frac{v}{\cos(\theta)}.$$

Figure 4C:
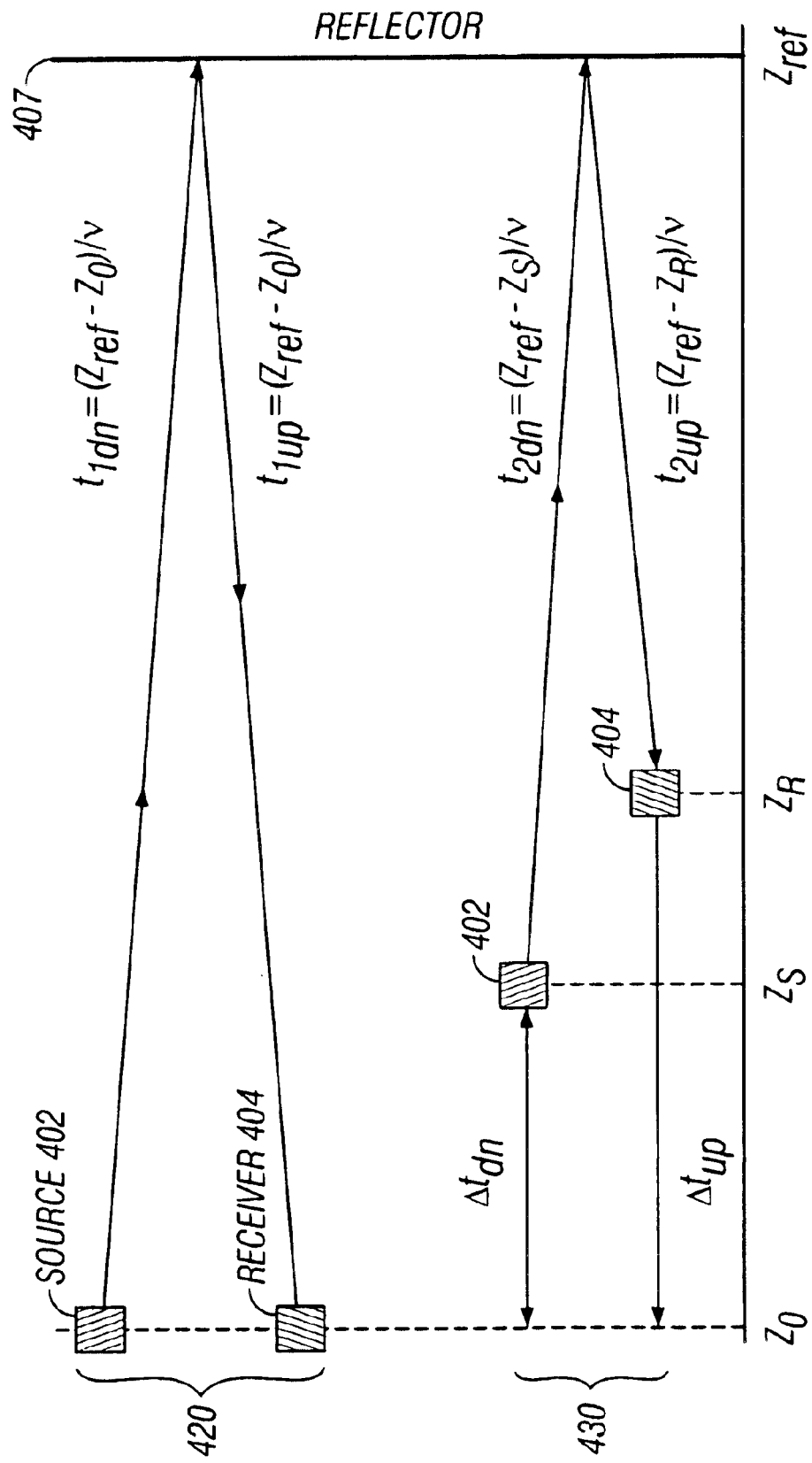
FIG. 4C illustrates a schematic of time shift relationship derivations according to the present invention.

FIG. 4C demonstrates schematically the derivation of the time shift to apply so that the source and receiver appear collocated. When the source and receiver are properly collocated, reflectors will sum constructively in the stacking process for both on and off-axis. The collocated source and receiver point traces are synthesized by time shifting so that they appear as illustrated in 420 of FIG. 4C. The time $t_{1dn}$ from the source 402 to the reflector 407 equals the distance $(Z_{ref}-Z_O)$ divided by the formation velocity, v. The time $t_{1up}$ for the energy to return from the reflector 407 to the collocated receiver 404 is the same calculation, $(Z_{ref}-Z_O)/v$.

A common situation for down hole seismic data is as illustrated in 430 of FIG. 4C where a source 402 and receiver are not collocated. To determine a time shift for a selected reference depth, $Z_O$, in terms of collocated source and receiver situation 420, the actual time from a source 402 to the reflector 407 and back to the receiver 404 are combined with the differences to the selected reference depth $Z_O$. The time difference from the selected reference to the source is $\Delta t_{dn}$. The time $t_{2dn}$ from the source 402 to the reflector 407 is $(Z_{ref}-Z_S)/v$. The time $t_{2dn}$ from the reflector to the receiver 404 is $(Z_{ref}-Z_R)/v$. The time difference between the receiver and the selected reference is $\Delta t_{up}$. The time difference between the selected reference depth and the source is seen to be $\Delta t_{dn}=(t_{1dn}-t_{2dn})$. The time difference between the selected reference depth and the receiver is seen to be $\Delta t_{up}=(t_{1up}-t_{2up})$. The time difference to apply the seismic data trace is then the combination of $\Delta t_{dn}$ and $\Delta t_{up}$. From this it is seen that $\Delta t_O=\Delta t_{dn}+\Delta t_{up}$. This leads to $$\Delta t_0 = \frac{(Z_S + Z_R - 2Z_0)}{v}.$$

As previously stated, if the waves arrived at an angle $\theta$ to the tool, then we replace the formation velocity v by the phase velocity $$\frac{v}{\cos(\theta)}.$$

The time shifts for stacking the data may be computed from the following equation:

$$\Delta t_0 = \frac{(Z_S + Z_R - 2Z_0)}{v}\cos(\theta).$$

This time shift, $\Delta t_O$, is the additive time shift for a trace having its source at depth $Z_S$, receiver at depth $Z_R$, and referenced to $Z_O$, a depth where the source to receiver offset appear collocated (a virtual zero offset location). The angle $\theta$ is the off-axis angle of investigation, and v is the local p-wave formation velocity.

Operationally, a wide range of source and receiver geometries may be used. For example the tool may comprise one source and multiple receivers, or multiple sources and receivers. The example downhole tool 417 of FIGS. 4A and 4B comprises one source 402 and eight receivers 404. If we accurately keep track of the acquired data depth positions relative to one another, then we can use the recordings from all source and receiver positions to synthesize a long arrayed 'antenna' that is focused ahead of the bit. We are not restricted to just looking directly along the borehole. We can form a beam at any angle relative to the borehole axis by proper processing of all the traces from a succession of source activations and with the proper selection of time delays. By time shifting and summing each trace according to the above equation, we simultaneously form the source beam and focus the receiver beam. The method and system of the present invention requires knowledge of the local formation acoustic velocity and the relative positions of all sources and receivers used in synthesizing the array. In effect we are creating a long virtual source-receiver arrayed antenna.

Launching waves into a formation, and capturing the reflections from the formation using the present invention can require the use of three additional types of trace groupings called gathers or sections: Common Receiver 403, Common Offset 407, and Common midpoint 415. These sections can be synthesized by taking each trace from the appropriate Common Source 409 recording. Furthermore, it is important that the location of the down hole acquisition tools be accurately known for each Common Source 409 recording. Otherwise, the calculated trace-to-trace stepout may not be precise enough to synthesize, and thereby, focus the source and receiver signals.

Figure 4D:
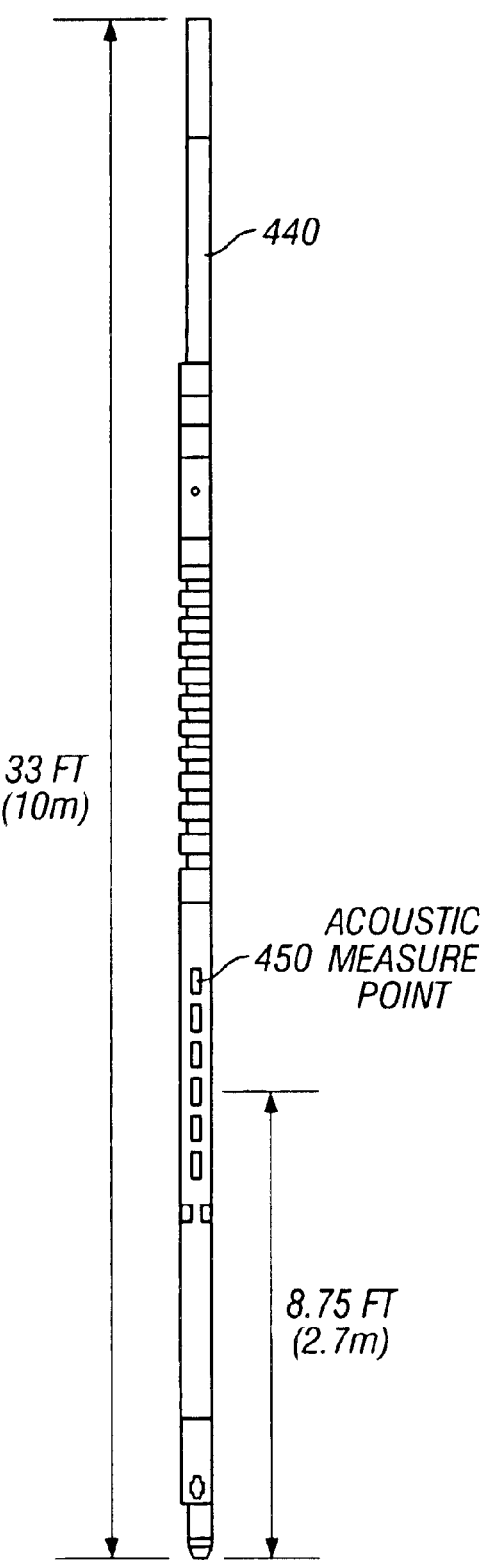
FIG. 4D Illustrates a downhole tool that includes seismic sources and seismic sensors.

A method of accurately determining a depth of a downhole drilling assembly is disclosed in U.S. application Ser. No. 10/167,332, filed Jun. 11, 2002 of Dubinsky et al, assigned to the assignee of the present invention, and fully incorporated herein by reference. An example of a downhole tool that may be used with the method of the present invention is illustrated in FIG. 4D, the Baker-Hughes INTEQ logging-while-drilling tool. This tool is referred to as the Acoustic Properties eXplorer (APX) 440. The APX tool includes seismic sources and seismic sensors 450.

Figure 5:
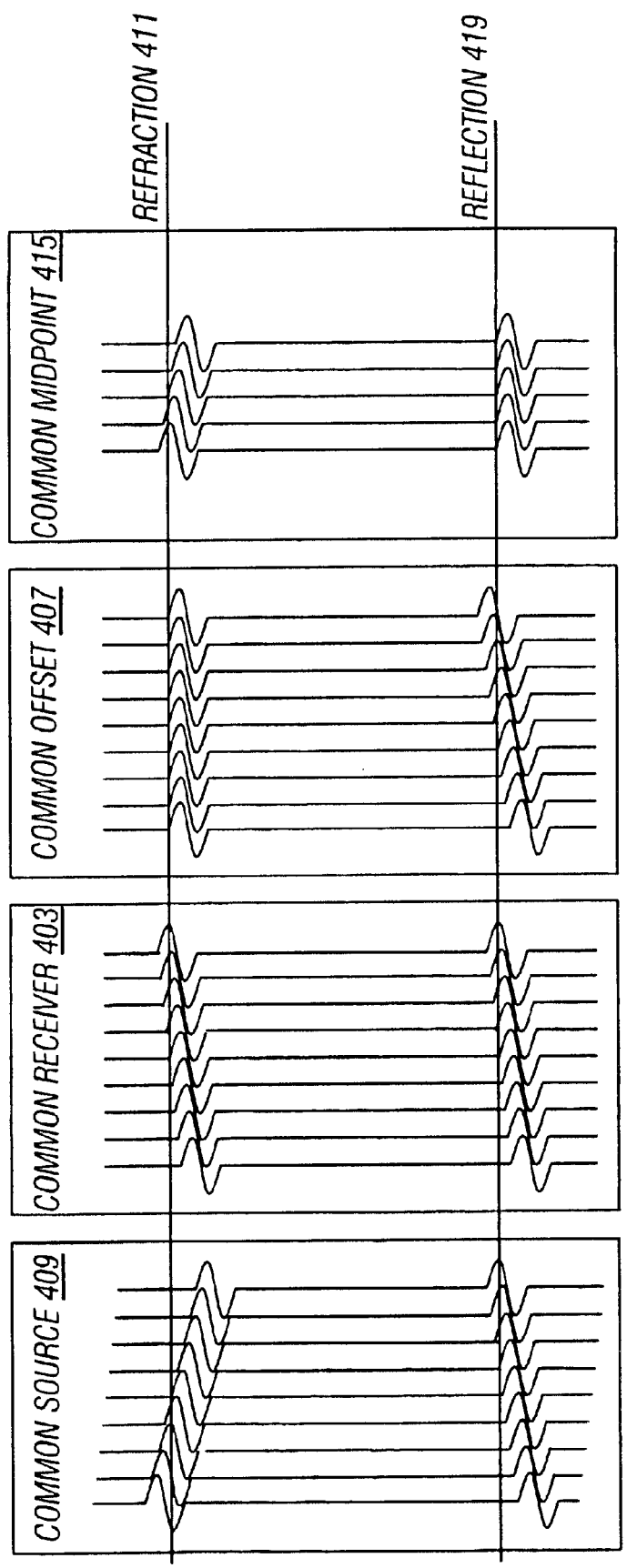
FIG. 5 illustrates examples of data gathers.

FIG. 5 illustrates a sampling of how the various common sections appear for a reflector directly ahead of the bit. The data gathers that are acquired are most often going to be Common Source 409 sections, though other acquisition gathers are possible depending on acquisition equipment and data storage. All these types of gathers can be synthesized by resorting the data. As illustrated in FIG. 5 the early arrival signal pulses are due to the refracted acoustic wave traveling along the borehole. In FIG. 5, line 411 is a reference line marking the approximate location refracted energy will arrive on the gather sections 409, 403, 407 and 415. The later arriving signal pulses are reflections which arrive along the reference line 419. In principle, all of the signals recorded would be utilized in processing. Of the four section types 409, 403, 407 and 415, prior art methods use only the Common Source 409 section in determining the local formation velocity. The formation velocity may be directly determined from the common offset section 407, using the refraction arrival 411. In prior art methods, recording ceases before significant reflections can arrive, as only the refracted arrival was desired. Additionally, no prior art use has been made of the three types of synthesized sections for looking ahead of the drill bit in a down hole environment.

Figure 6:
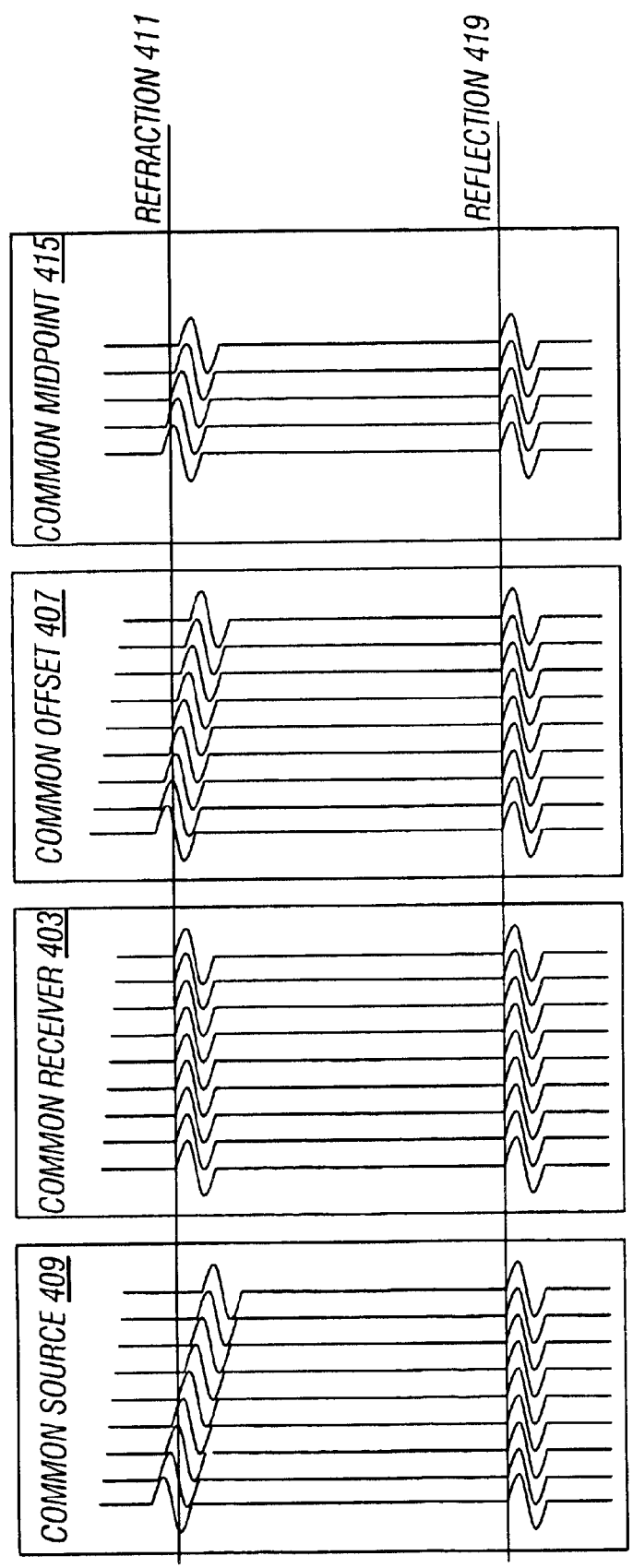
FIG. 6 illustrates examples of data gathers after applying selected time shifts.

As illustrated in FIG. 6, with proper time shifting, the reflection events 419 become coherent in time and sum or stack to produce a strong reflected seismic event. The early refracted events 419 are skewed by various amounts on each trace and their stack response will be attenuated as the result of destructive interference due to misaligned energy. Close spacing of recorded data can provide improved contributions to stacked sections due to improved signal-to-noise ratio (SNR). However, no matter how many traces are used, the reflection event still stacks up for properly time shifted data while the refraction event is diminished.

Figure 7:
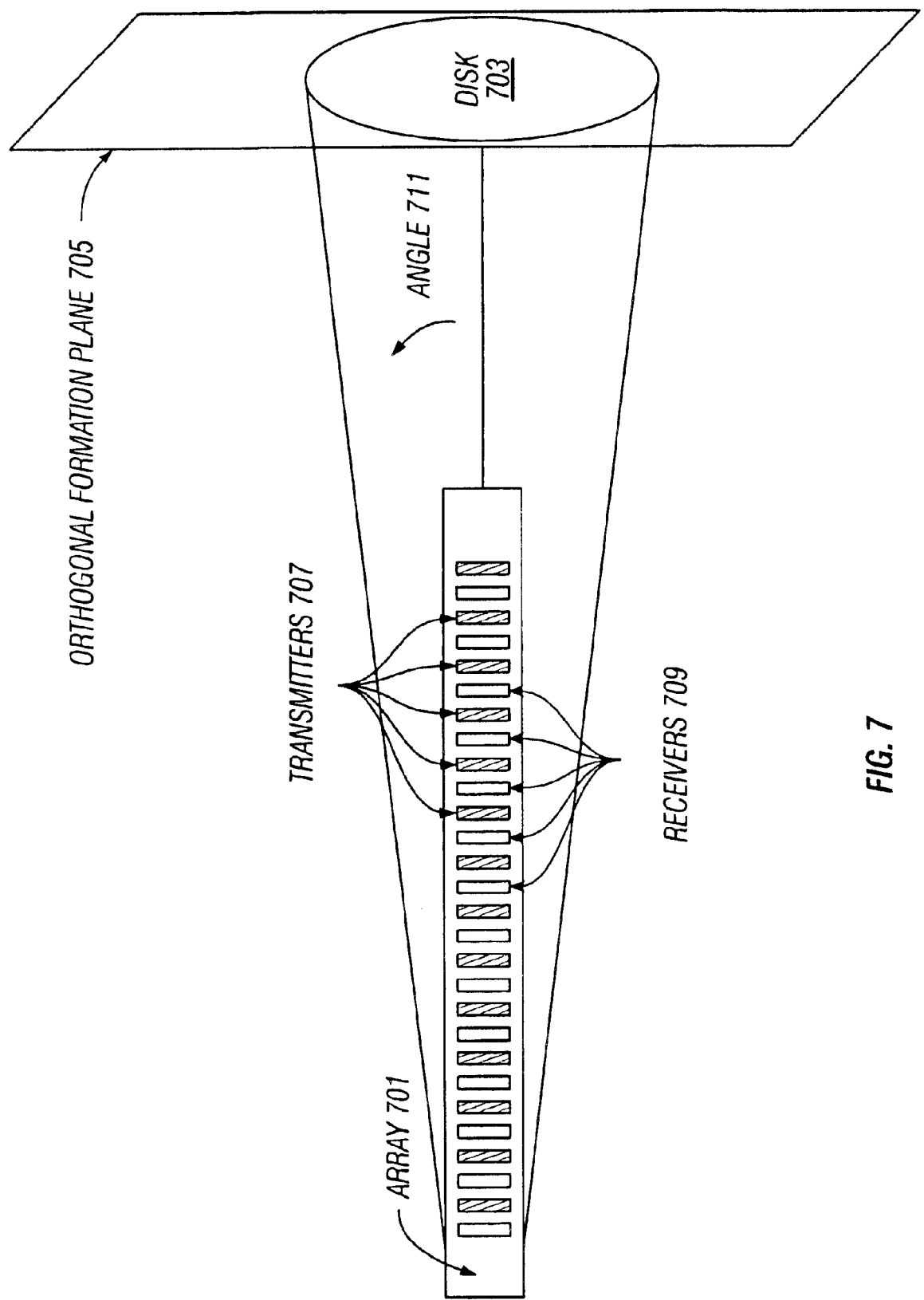
FIG. 7 illustrates a downhole synthesized seismic array for looking ahead of the drill bit.

For looking seismically ahead of the drill bit with down hole seismic acquisition tools, the acoustic sources and receivers are necessarily arrayed along the borehole. Using a long acoustic tool may be impracticable since drilling assemblies are quite short compared to the seismic wavelength. However, the desired arrays can be synthesized in data processing from the aggregate of recordings obtained during incremental movement of the relatively short drilling tool. FIG. 7 illustrates a MWD synthesized seismic array 701 relative to the locus 703 of the data which will be in phase with proper time delay data shifting. The data are focused at the disk 703. The edge of disk 703 will not be "hard" but will become more "fuzzy" or less focused as toward the outside edge of disk 703. The MWD synthesized seismic array 701 is illustrated in FIG. 7 as having alternating receivers 709 and transmitters 707, though other arrangements may be equivalent depending on tool acquisition geometries or choices of data processing parameters. As illustrated in FIG. 7, the disk 703 is defined with the angle to the direction of the array by the angle 711. For imaging directly ahead of the drilling assembly, the angle 711 is approximately equal to 0, and therefore the cosine of the angle is approximately equal to 1.

By exploiting the property of axial phase velocity of a wave traveling obliquely to the borehole, we can investigate the formation along off-axis annular rings rather than just imaging directly the area ahead of the bit. This means that at a given angle, the constructive interference will occur on energies returning from anywhere on the ring. This ring is defined by the length of the array and the amplitude of the returning energies. The shorter path length, from the center circle of the ring, will have the strongest signal and the outer edge will be the least strong.

Figure 8:
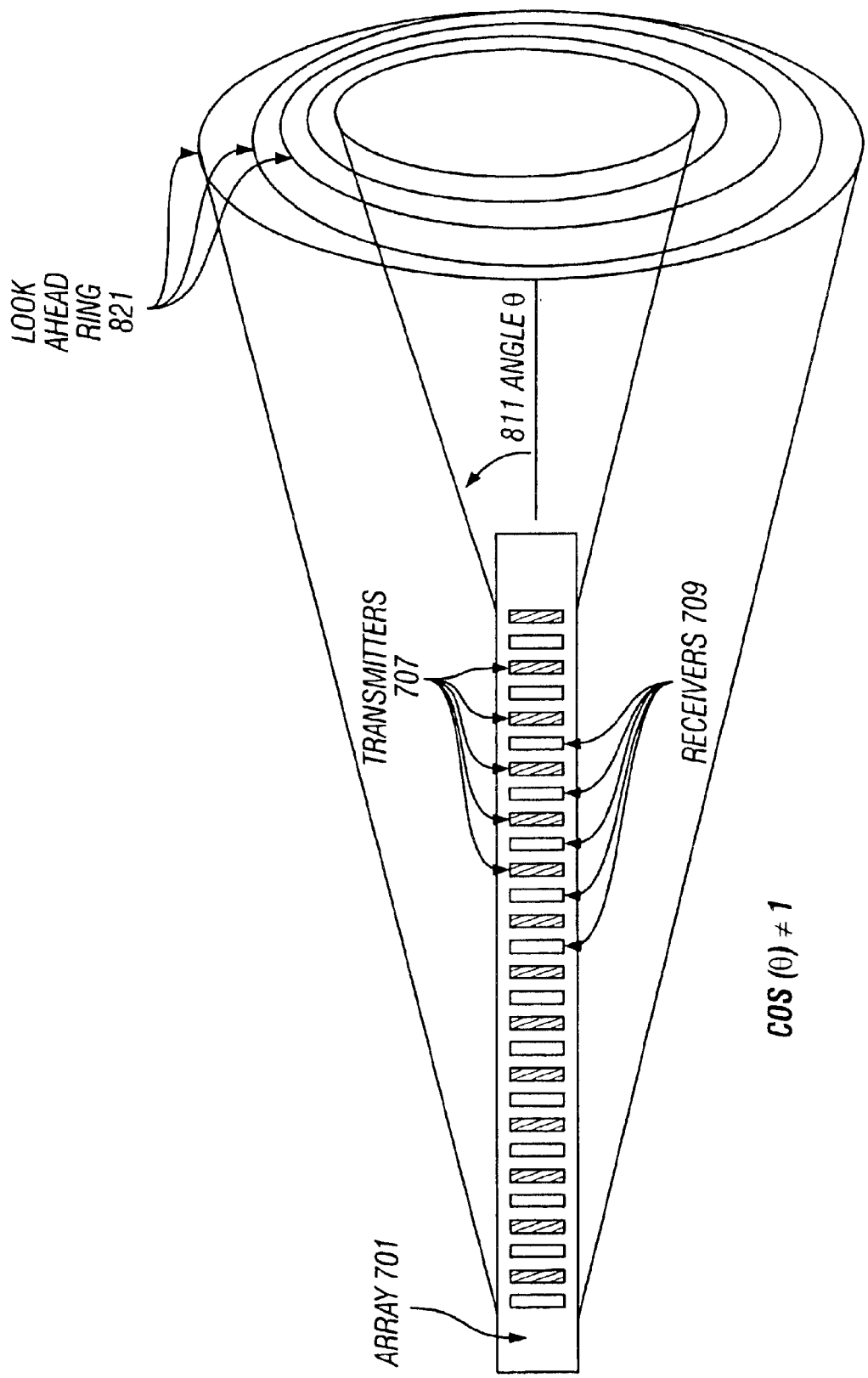
FIG. 8 illustrates a downhole synthesized seismic array looking ahead of the drill bit, off the axis of the drilling direction.

FIG. 8 illustrates the geometry for imaging look-ahead rings 821 with the synthesized seismic array 701. A synthesized array 701 of alternating receivers 709 and transmitters 707 can be used to focus seismic energy returning to the array 701 from rings 821 along an angle 811 to the array. The angle 811 is more inclined to the direction of the axis of the array than for the FIG. 7 disk 703 angle 711, and the inclination to the axial direction increases as the angle 811 increases.

Figure 9:
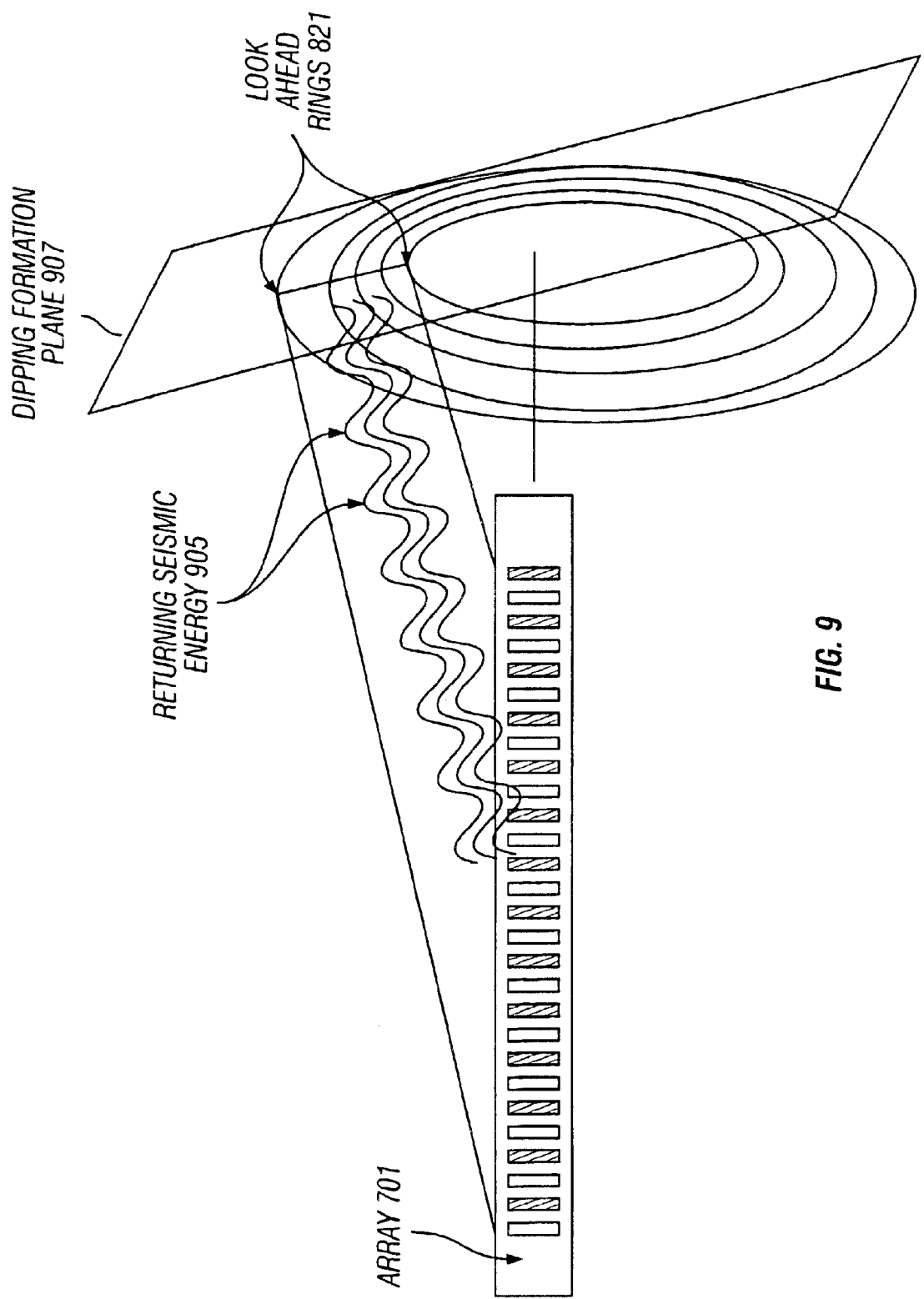
FIG. 9 illustrates a downhole synthesized seismic array looking ahead of the drill bit at dipping reflectors.

FIG. 9 illustrates schematically the returning energies 905 from part of a set of rings, for example from an area of a formation plane 907 which has dip that is not normal to the drilling direction. The returning energies 905 is an illustration to show the oblique incidence of the energy on the synthesized array 701. Modeling and/or quadrature receivers can be used to determine which quadrant the energy arrives from.

Figure 10:
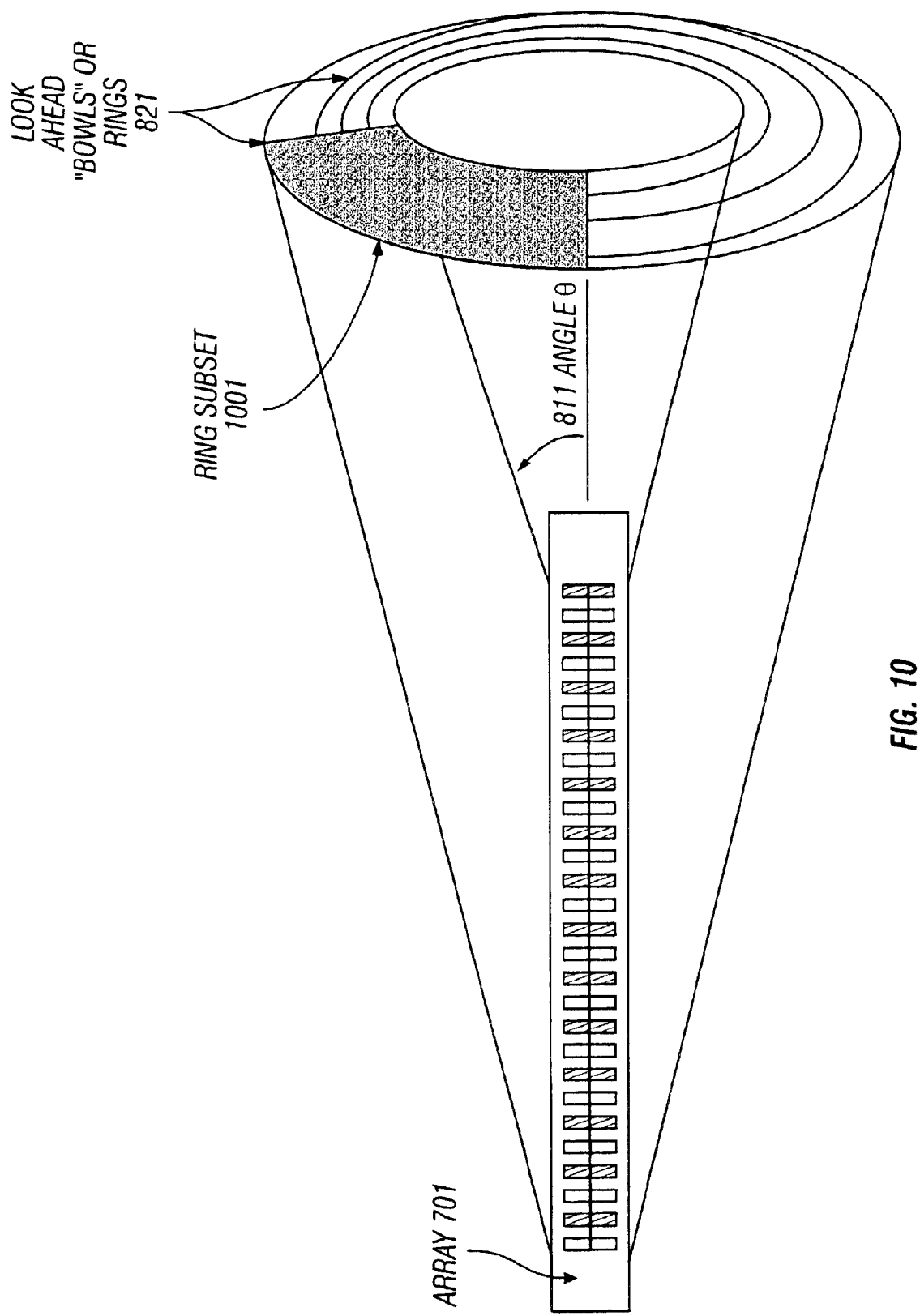
FIG. 10 illustrates a downhole synthesized seismic array looking ahead of the drill bit selectively looking off the axis of the drilling direction to a quadrant.

FIG. 10 illustrates that with quadrature receivers, or receivers segmented around the axis of the logging tool or BHA, it is be possible to select or compute a ring subset 1001 of the rings 821 to provide an ability to image in one selected direction and compare this image with another selected direction. This is done by processing and recomputing the data, not re-acquiring it.

Figure 11:
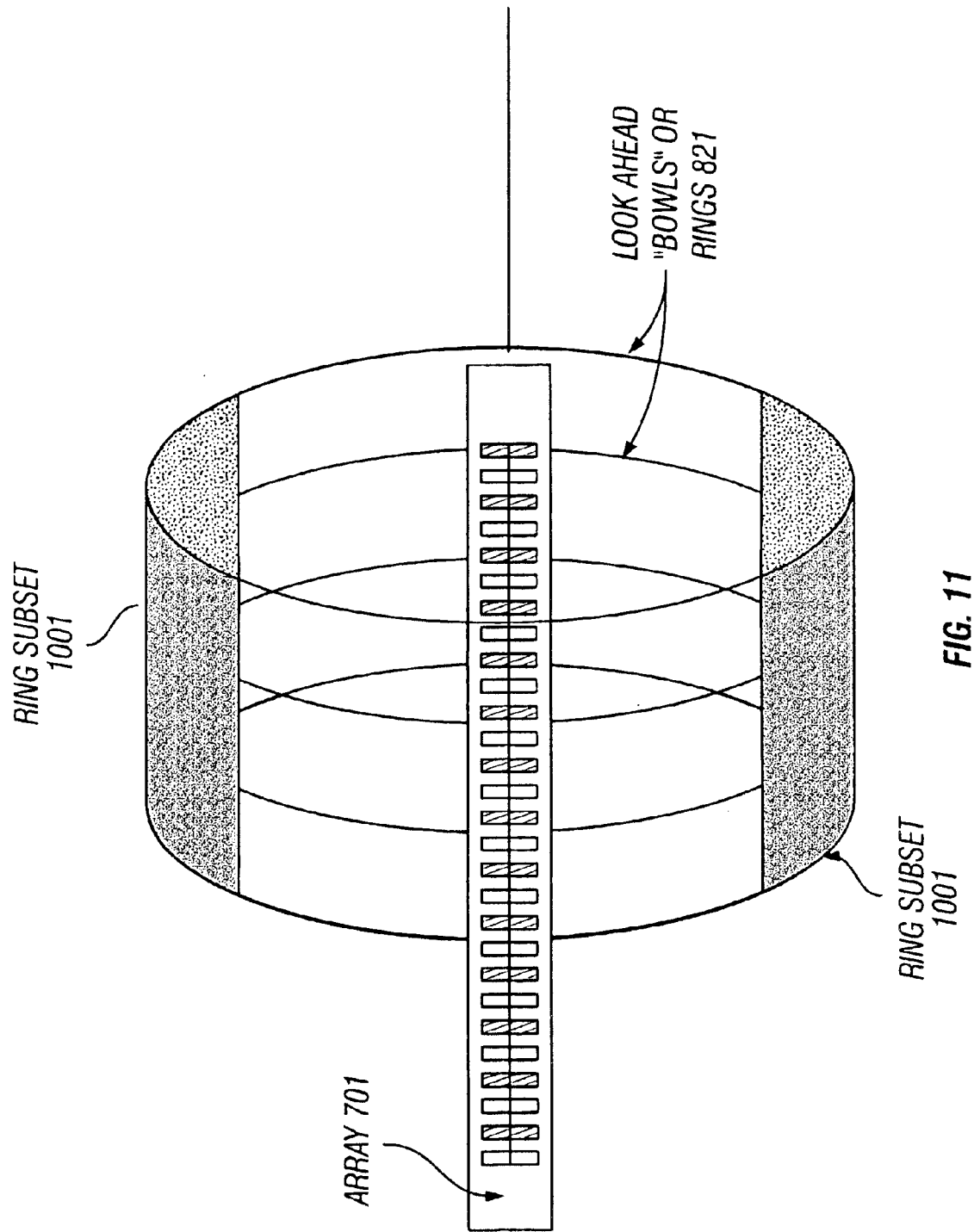
FIG. 11 illustrates a downhole synthesized seismic array directionally looking to sides of the borehole.

FIG. 11 illustrates that as the angle (811 of FIG. 8) opens towards 90 degrees, we start to look around the borehole.

Quadrature then enables us to determine a side looking array perpendicular to the borehole in any direction to enable imaging reflectors substantially parallel to the wellbore. The ring subsets 1001 are then perpendicular to the synthesized array 701. This would be especially useful in guiding the borehole within a reservoir.

The method and apparatus of the present invention provides for fast processing and careful manipulation of time shifts and proper rotation of quadrature data to enable determination of several images from one data set and so to illuminate a greater area in a desired direction. The present invention allows interpretation of these data sets in time or Depth to make rapid drilling decisions to gain more value from reservoirs due to improved wellbore placement resulting in more efficient reservoir exploitation.

Seismic energy may be enhanced along the axis of the borehole by cascaded initiation of the sources. For example, a down hole tool may have a plurality of sources that are fired sequentially so that the seismic energy from each source forms a unified and directed wavefront. The cascading of seismic sources gives a directed wavefront in the drillbit direction. This improves the signal to noise ration by allowing a higher amplitude reflection signal from formations ahead of the bit.

This invention encompasses the use of acoustic data generated and received downhole, the purpose of the recording is to process the data in such a way as to look directly ahead of the bit, along the drill bit axis or, depending on the processing algorithm, at an area around the drill bit at an angle away from the drill string axis. The crux of the new idea is the relatively simple processing method used on the data.

The recording system, which may be a downhole sonic tool or a modified version of recording tool, records acoustic data at many depth points, of small increment, so making a large series of measurements from a much smaller number of receivers, a and forming synthetic array. The processing sequence takes advantage of the fact that the signals come from a repeatable source so that the data might be the equivalent of a very high number of receivers recorded at the same time from one source. This is the equivalent of a mini seismic survey with the source downhole instead of on the surface and moving downhole at the same rate as the receivers.

The method and apparatus of this invention uses a processing sequence that enables common depth point stacking to enhance the signal to noise ratio (SNR) of the reflected acoustic field directly. In addition, a time shift is calculated and applied to the data for each common depth point, shifting all the data back to a common source depth before stacking again. This further enhances the reflected wavefield, and may be done before any sort of gain is applied. This double stacking enables desired signals to have much higher SNR and enables directivity in the "raw" data.

In summary, the time delays are determined using equation $$\Delta t_0 = \frac{(Z_S + Z_R - 2Z_0)}{v} \cos(\theta),$$

where $\Delta t_O$ is the additive time shift for a trace having its source at $Z_S$, receiver at $Z_R$, and referenced to zero offset $Z_O$. $\theta$ is the off-axis angle of investigation v is the local p-wave velocity. This determination of the time shift enables the process to determine the angle, or directivity where the data are stacked constructively referenced from drill bit axis. All other data from non-selected angles suffers from destructive interference, so enhancing signal to noise again. This is seen to be a coaxial annular ring defined by the inclusive depth range of the data and the angle from the drill axis. The determination of the formation velocity in the vicinity of the source-receiver offset is also needed. This processing can be done downhole or the raw or processed data can be transmitted uphole. The resultant data set can be processed in a manner similar to a VSP data set and an image of the formation reflections can be formed.

The method and apparatus of the present invention provide for high resolution images of reflection events in front of or at an angle to the planned and actual drill path. When images can be determined ahead of the drill bit, the drill path can be modified for better exploitation of the reservoirs. Interpretation of these images can enable drilling decisions to be made with much greater certainty of what is about to be drilled or the proximity of events that the driller is trying to avoid.

The acquisition hardware can be easily modified by those skilled in the art to accomplish the data acquisition tool configurations disclosed herein. Lower frequency, higher amplitude sources with reduced tool body waves are beneficial. Cascading or time delayed firing of the sources improves directionality in the direction of the borehole to enable higher amplitude source data. Segmentation of the receivers on the acquisition tool may be accompanied with appropriate time shifts for each receiver that enable active "beamsteering" of the imaged area to "above", "below" and to the "side" and can allow several images from one data set to enhance the ability to interpret the downhole environment.

Thus, the method of the present invention provides for determining images in front of the drill bit in and near the direction of the drilling axis. Persons skilled in the art will understand that the method and apparatus described herein may be practiced including but not limited to the embodiments setout herein. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method of determining a property of an earth formation using an acoustic logging tool on a bottomhole assembly (BHA) in a borehole in said earth formation, the method comprising:

(a) using at least one transmitter in said acoustic logging tool for generating acoustic signals into said formation at a first depth of said BHA;

(b) using a plurality of receivers on said logging tool for receiving acoustic signals, said plurality of receivers spaced apart axially from said at least one transmitter;

(c) repeating (a) and (b) at least one additions depth of said BHA;

(d) sorting said signals at said first depth and said at least one additional depth into at least one of (i) a common receiver gather, (ii) a common offset gather, and, (iii) a common-midpoint gather, giving re-sorted signals; and (e) processing said re-sorted signals to obtain an acoustic image oblique to the borehole axis.

2. The method of claim 1 wherein said at least one transmitter comprises a plurality of transmitters.

3. The method of claim 2 further comprising sequentially firing said plurality of transmitters in the borehole axial direction according to time delays selected using a formation velocity.

4. The method of claim 1 wherein at lest one of said plurality of receivers comprise segmented receivers.

5. The method of claim 1 wherein processing further comprises determining a velocity from a common source gather.

6. The method of claim 1 wherein processing further comprises selecting at least one quadrant off the axis of the borehole.

7. The method of claim 1 wherein processing further comprises defining time shifts according to an imaging direction oblique to the axis of the borehole.

8. The method of claim 7 wherein time shifts, $\Delta t_O$, are determined according to $$\Delta t_0 = \frac{(Z_S + Z_R - 2Z_0)}{v}\cos(\theta);$$

where $Z_S$ is the source depth; $Z_R$ is the receiver depth; $Z_O$ is the selected reference depth; v is the formation velocity; and $\theta$ is the angle of investigation.

9. The method of claim 1 wherein processing further comprises selecting a set of time shifts such that said at least one transmitter and said at least one receiver appear collocated at a selected reference depth.

10. A system for determining a property of an earth formation using an acoustic logging tool on a bottomhole assembly (BHA) in a borehole in said earth formation, the system comprising:
   (a) at least one transmitter in said acoustic logging tool for generating acoustic signals into said formation at a depth of said BHA;
   (b) a plurality of receivers on said logging tool for receiving acoustic signals at a plurality of borehole depths, said plurality of receivers spaced apart axially from said at least one transmitter;
   (c) wherein the acoustic signals received at said plurality of depths are sorted into at least one of (i) a common receiver gather, (ii) a common offset gather, and, (iii) a common-midpoint gather, giving re-sorted signals; and
   (d) wherein said re-sorted signals are processed to obtain an acoustic image oblique to the axis of the borehole.

11. The system of claim 10 wherein said at least one transmitter comprises a plurality of transmitters.

12. The system of claim 11 wherein said plurality of transmitters are sequentially fired in the direction along the axis of the borehole according to time delays selected using a formation velocity.

13. The system of claim 10 wherein at least one of said plurality of receivers comprise segmented receivers.

14. The system of claim 10 wherein a formation velocity is determined from a common source gather.

15. The system of claim 10 wherein a plurality of time shifts are defined according to an imaging direction oblique to the axis of the borehole.

16. The system of claim 15 wherein said time shifts, $\Delta t_O$, is a time shift, are determined according to $$\Delta t_0 = \frac{(Z_S + Z_R - 2Z_0)}{v}\cos(\theta);$$

where $Z_S$ is the source depth; $Z_R$ is the receiver depth; $Z_O$ is the selected reference depth; v is the formation velocity; and $\theta$ is We angle of investigation.

17. The system of claim 10 wherein a set of said time shifts is defined such that said at least one transmitter and said at least one receiver appear collocated at a selected reference depth.

18. A method of using an acoustic logging tool conveyed in a borehole in a formation for determining a characteristic of the formation, said logging tool having at least one signal transmitter and at least one receiver, the method comprising:
   (a) acquiring data with receivers from said signal transmitter,
   (b) determining a formation velocity;
   (c) selecting an angle of investigation oblique to the axis of the borehole;
   (d) processing the acquired data comprising selecting a set of time shifts for said acquired data such that said at least one source and said at least one receiver appear collocated at a selected reference depth;
   (e) applying selected time shifts to said seismic data.

19. The method of claim 18 wherein time shifts, $\Delta t_O$, are determined according to $$\Delta t_0 = \frac{(Z_S + Z_R - 2Z_0)}{v}\cos(\theta);$$

where $Z_S$ is the source depth; $Z_R$ is the receiver depth: $Z_O$ is the selected reference depth; v is the formation velocity; and $\theta$ is the angle of investigation.

20. The method of claim 18 further comprising a plurality of signal transmitters are sequentially fired in the borehole axial direction according to time delays selected using said formation velocity.

21. The method of claim 18 further comprising acquiring data wherein said at least one receiver is a segmented receiver.

22. The method of claim 18 wherein selecting said angle of investigation further comprises selecting at least one quadrant off the axis of the borehole.

23. The method of claim 19 wherein selecting said angle of investigation further comprises selecting at least one quadrant off the axis of the borehole.

* * * * *